United States Patent [19]

Gollub

[11] Patent Number: 5,018,136
[45] Date of Patent: May 21, 1991

[54] MULTIPLEXED DIGITAL PACKET TELEPHONE SYSTEM

[75] Inventor: Raphael Gollub, St. Louis Park, Minn.

[73] Assignee: Republic Telcom Systems Corporation, Boulder, Colo.

[21] Appl. No.: 579,189

[22] Filed: Sep. 5, 1990

Related U.S. Application Data

[60] Continuation of Ser. No. 212,044, Sep. 6, 1988, abandoned, which is a division of Ser. No. 119,273, Nov. 9, 1987, Pat. No. 4,782,485.

[51] Int. Cl.$^5$ .......................... H04J 15/00; H04J 3/24
[52] U.S. Cl. .................................. 370/60.1; 370/94.1; 370/118
[58] Field of Search ...................... 370/60.1, 94.1, 94.2, 370/85.1, 85.6, 99, 110.1, 118, 95.1; 375/122; 381/29-34

[56] References Cited

U.S. PATENT DOCUMENTS

| | | | |
|---|---|---|---|
| 4,453,247 | 6/1984 | Suzuki et al. | 370/94 |
| 4,589,110 | 5/1986 | Eng et al. | 370/118 |
| 4,730,348 | 3/1988 | MacCrisken | 370/118 |
| 4,771,425 | 9/1988 | Baran et al. | 370/118 |
| 4,782,485 | 11/1988 | Gollub | 370/118 |

Primary Examiner—Curtis Kuntz
Attorney, Agent, or Firm—Dorsey & Whitney

[57] ABSTRACT

An efficient system for simultaneously conveying a large number of telephone conversations over a much smaller number of relatively low-bandwidth digital communication channels is disclosed. Each incoming telephone speech signal is filtered, periodically sampled, and digitized. An efficient computational speech compression algorithm is applied to transform a sequence of digitized speech samples into a much shorter sequence of compression variables. The compression variable sequence is further processed to construct a minimum-length bit string, and an identifying header is appended to form a packet. Only a few packets containing information on representative background noise are generated during pauses in speech, thereby conserving digital bandwidth. The packets are queued and transmitted asynchronously over the first available serial digital communication channel. Numerical feedback to the compression algorithm is employed which results in the packet size being reduced during periods of high digital channel usage. Packet header information is utilized to establish a "virtual circuit" between sender and receiver.

6 Claims, 5 Drawing Sheets

MULTIPLEXED DIGITAL PACKET TELEPHONE SYSTEM

This is a continuation of Ser. No. 212,044, filed Sept. 6, 1988, now abandoned, which is a division of application Ser. No. 119,273, filed Nov. 9, 1987, now U.S. Pat. No. 4,782,485.

TECHNICAL FIELD

The invention disclosed herein pertains to multi-channel telephonic communications. In particular, it pertains to a system which utilizes a small number of relatively low-bandwidth digital communication channels to asynchronously convey a much larger number of simultaneous telephone conversations in a digital packet format.

BACKGROUND ART

Techniques for communicating telephone conversations in digital format have become commonplace in recent years. The telephone signal is usually filtered to limit its bandwidth and is then sampled at a rate that is at least twice the frequency of its highest frequency component. The repetitive samples are applied to an A/D converter to obtain digital representations of the analog samples. Although volume compression and expansion may be utilized to increase the system's dynamic range, it is generally conceded that at least eight bits are required for each digital sample in order that the quantization noise be held to an acceptable minimum. Thus, the generally accepted digital bandwidth required to digitally communicate a telephone signal that is frequency-limited to 4 kilohertz, is at least 2 times 4 times 8, or 64 kilobits per second.

Synchronous time-division multiplexing (TDM) is generally employed to simultaneously carry a plurality of digitized telephone conversations over a single digital channel. With synchronous TDM, each digital telephone channel occupies a precise "time slot" in a high bit-rate serial data sequence. Synchronous TDM accommodates a fixed number of telephone channels and requires that a "time slot" be assigned to each channel whether or not the channel is being used. Such inflexibility can be very wasteful of digital bandwidth. To accommodate 40 unidirectional telephone channels by conventional synchronous TDM would require a digital bandwidth of approximately 40 times 64 kilobits, or 2.56 megabits per second.

It is desirable for economic reasons to increase the digital efficiency of a telephone system so that a large number of telephone channels can be accommodated by a given digital bandwidth. The digital efficiency of conventional TDM can be increased by the use of digital speech interpolation (DSI) techniques. With DSI, a "time slot" is only assigned to a particular telephone channel during periods of actual speech and is dynamically reassigned to another telephone channel during a speech pause. Since pauses are known to occupy about 60 percent of a typical speech pattern, DSI can theoretically increase digital efficiency by about a factor of 2.5. Because of statistical variations in speech patterns, however, a factor of 1.5 is more typically obtained in practice. In addition, DSI efficiency is further reduced by the fact that a "channel assignment table" must be transmitted each TDM cycle to permit the receiver to unambiguously identify the current occupant of each "time slot".

Instead of synchronously transmitting individual digital samples of speech in TDM "time slots", longer sequences of samples can be assembled and transmitted asynchronously as packets—each packet being identified by a packet "header". As with DSI TDM, the digital efficiency of a multiplexed packet telephone system can be increased by a factor of about 1.5 by suppressing speech pauses and transmitting only packets containing samples obtained during spurts of actual speech. Because of the asynchronous nature of packet transmission, however, such systems have required that a "time stamp" be appended to each sequence of actual speech samples so that the appropriate speech pauses could be correctly re-inserted at the receiving terminal. Such "time stamping" increases packet overhead and seriously complicates the speech reconstruction process An example of a multiplexed speech transmission system employing "time stamped" packets of digitized speech samples has been disclosed in Flanagan U.S. Pat. No. 4,100,377.

Recent advances in technology have provided means for new approaches to increasing the digital efficiency of multiplexed digital telephone systems. In particular, the recent development of high-performance microprocessors capable of many complex calculations per second has made possible the real-time implementation of powerful, but computationally intensive, speech compression algorithms. A variety of such computational algorithms are presently available and are well-known to those of ordinary skill in the art. Such algorithms typically rely upon the principles of time-domain harmonic scaling, transform coding, linear or adaptive predictive coding, sub-band coding, or combinations thereof.

All such computational speech compression algorithms share one common feature. They can effectively transform relatively large groups of digitized speech samples into much smaller sequences, or "frames", of digital compression variables at the transmitting end of a circuit for transmission efficiency, and then expand the frames at the receiving end to approximate the original larger groups of speech samples while still maintaining acceptable speech fidelity. Using techniques that are known to those of ordinary skill in the art, compression ratios—defined as the number of bits in a frame of digital compression variables divided by the number of bits in the corresponding group of digital speech samples—of less than 0.25 can presently be routinely achieved with computational algorithms which still maintain telephone-quality speech. The real-time implementation of such computational speech compression algorithms in a multiplexed digital telephone system has, however, not heretofore been accomplished.

SUMMARY OF THE INVENTION

The telephone system herein disclosed is a highly efficient system for conveying a large number of simultaneous telephone conversations (e.g., 40) over a much smaller plurality (e.g., 4) of relatively low-bandwidth digital channels (e.g., 56 1 kb/sec) in digital packet format. Low-bandwidth digital channels of the type employed herein have heretofore been used only for data communication since even a small number of digitized telephone signals have traditionally required a much wider bandwidth.

In the present invention, each incoming telephone speech signal is filtered, periodically sampled, and digitized. An efficient computational speech compression algorithm is applied to successive groups of digitized speech samples; each group being representative of a speech interval ranging in duration from about 15 milliseconds to about 50 milliseconds. This computational algorithm transforms each group of samples into a much smaller sequence, or "frame", of digital speech compression variables. The compression ratio of the transformation, defined to be the ratio of the number of bits in a frame to the number of bits in the corresponding group of digital samples, is less than 0.25.

Each frame of digital compression variables is further processed to construct a minimum-length bit string, and an identifying header is appended to each string to form a packet. Only a few packets containing information on representative background noise are generated during pauses in speech in order to conserve digital bandwidth.

Each packet is queued, along with similar packets derived from other similar telephone channels, and transmitted asynchronously over the first available one of a number of serial digital communication channels operating at, e.g., 56 kilobits per second. Numerical feedback to the microprocessor implementing the computational speech compression algorithm is employed which results in the packet size being dynamically reduced during periods of high digital channel usage. Packet header information is utilized to establish a "virtual circuit" between sender and receiver. The packets may be transmitted from the sender to the receiver via intermediate terminals along the "virtual circuit". The packets are requeued at each intermediate terminal, along with the packets generated at the intermediate terminal, and are asynchronously retransmitted from the intermediate terminal over the first available one of a plurality of serial digital channels.

The packet header is employed to route the packet to the circuitry servicing the appropriate telephone channel at the ultimate receiving terminal. The packeting procedure is thereupon reversed. The header is stripped from the packet and the minimum-length bit string is expanded to recover the frame of digital speech compression variables. Approximations to the original digitized speech samples are synthesized from the recovered speech compression variables by means of an appropriate computational inverse speech compression algorithm. An intentional delay is thereupon introduced to build a backlog pool of samples to buffer against gaps in speech due to statistical fluctuations in packet arrival times. Digital samples from this pool are periodically outputted to a D/A converter and its analog output is appropriately filtered to approximately reproduce the original frequency-limited telephone signal. Representative background noise is synthesized during pauses in speech from information contained in previously received background information packets.

In the invention disclosed herein, the need for "time stamping" the speech data as in Flanagan U.S. Pat. No. 4,100,377 is totally avoided. This desirable result is primarily due to the fact that the maximum speech interval represented by an individual packet according to the present invention is only about 50 milliseconds—a time that is substantially less than the length of a typical speech spurt. In contrast, Flanagan's much longer packets contain at least one speech spurt and may contain several. Thus, since packets of the present invention are inherently smaller than those of Flanagan, packet delays as well as variations therein will also be inherently smaller. Furthermore, since a speech spurt comprises many packets, the time interval between the reception of the packet containing the last frame at the end of a speech spurt and the reception of the packet containing the first frame at the beginning of the next speech spurt will correspond approximately to the actual length of the pause between the two spurts in real time. Finally, the present invention takes advantage of the fact that the human ear is highly insensitive to small variations in the lengths of the pauses between speech spurts Thus, no attempt is made to accurately reproduce the lengths of these pauses. In fact, as will be discussed more fully herein below, speech pauses are treated as flexible parameters in setting up the FIFO buffers which smooth out potential variations in timing of outputted speech samples which could arise from statistical fluctuations in speech packet arrival times.

One object of the invention herein disclosed is to provide a digital telephone system employing the novel implementation of real-time digital signal processing to obtain digital efficiencies greater than those obtained in conventional telephone systems.

Another object of this invention is to provide a multiplexed digital telephone system employing asynchronously transmitted data packets to avoid the wasted digital channel capacity associated with synchronous time division multiplexing but without the necessity for "time-stamping" the packets.

Another object of this invention is to provide a multiplexed digital packet telephone system wherein digital efficiency is enhanced by generally transmitting packets only during periods of actual speech and wherein background noise is synthesized at the receiving terminal during pauses in speech by using stored information obtained from occasionally transmitted background information packets.

Another object of the present invention is to provide a multiplexed digital packet telephone system wherein speech gaps due to statistical fluctuations in packet arrival times are avoided by sufficiently delaying the outputting of digital speech samples at the receiving terminal to build a backlog pool of such samples to buffer against such gaps.

Another object of this invention is to provide a multiplexed digital packet telephone system employing numerical feedback to dynamically adjust the computational speech compression algorithm in accordance with the total digital data load in order to accommodate a large number of telephone channels but still reduce the likelihood of packet discards during temporary periods of high data loading of the serial digital channels Still another object of the present invention is to provide a high-capacity digital multiplexed telephone system which utilizes a plurality of relatively low-bandwidth serial communication channels of the type that are normally used only for data communication rather than a single higher-bandwidth channel in order to derive economic advantages therefrom.

These, and other, objects of the present invention will become apparent from a reading of the detailed description herein below together with the appended claims.

DETAILED DESCRIPTION OF THE DRAWINGS

Figure 1:
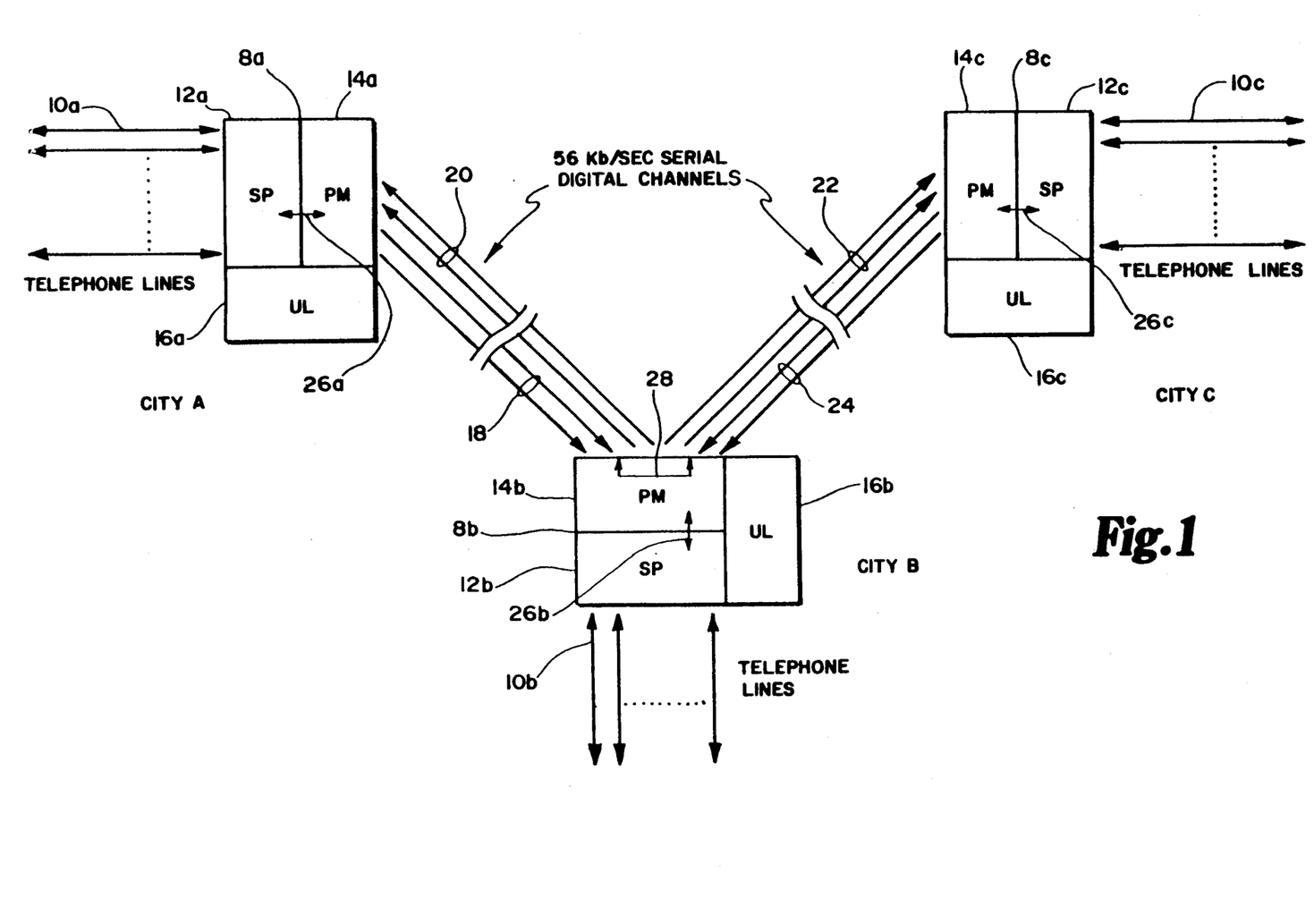
FIG. 1 is a block diagram of a simple multiplexed digital telephone system comprising three digital telephone terminals located at three different cities in accordance with the present invention.

Referring now to FIG. 1, a simple multiplexed digital packet telephone system in accordance with the present invention is represented in block diagram form. The system comprises three digital telephone terminals, represented generally as 8a, 8b, and 8c, located in three different cities denoted as City A, City B, and City C. In each city, a plurality of bi-directional telephone lines 10a, 10b, or 10c coming from a Telephone Company Central Office or PBX switchboard interfaces with a Speech Processor (SP) section 12a, 12b, or 12c of the appropriate corresponding digital telephone terminal 8a, 8b, or 8c. In addition to a Speech Processor section, each terminal further comprises a Packet Multiplexer (PM section 14a, 14b, or 14c and a Utility Logic (UL) section 16a, 16b, or 16c. Packet Multiplexer sections 14a, 14b, and 14c interface with a small plurality of serial digital channels 18, 20, 22, and 24 interconnecting the cities and carrying digital information in opposite directions at an individual channel rate of, e.g., 56 kilobits per second.

Still referring to FIG. 1, the implementation of a telephone call from a user in City A to another user in City C may be described by the following sequence of events:

Circuitry within Speech Processor section 12a of terminal 8a detects "off-hook" status and decodes the dial code inputted on one of the plurality of telephone lines 10a. This dial code, which may be in either pulse-dial (i.e., rotary-dial phone) or DTMF (Dual Tone Multi Frequency—i.e., "Touchtone") format, indicates that the call's recipient is in City C. In response, Speech Processor section 12a constructs appropriate signalling packets which are communicated to Packet Multiplexer section 14a via internal communication path 26a. Packet Multiplexer section 14a, in turn, interchanges signalling packets with Packet Multiplexer section 14b in City B via first available ones of serial digital channel pluralities 18 and 20 and Packet Multiplexer section 14b interchanges signalling packets with Packet Multiplexer section 14c in City C via first available ones of serial digital channel pluralities 22 and 24.

Using a standard Link Access Protocol (LAP B) to ensure accuracy, the terminals 8a, 8b, 8c intercommunicate and agree to establish a "virtual circuit" between the appropriate one of the plurality of telephone lines 10a in City A and another one of the plurality of telephone lines 10c interfacing terminal 8c at City C. Thereafter, for the duration of the call, all signalling and speech information communicated between these two telephone lines is digitized and coded into packets which are identified by particular address codes that are unique to this "virtual circuit".

Any such packet going from City A to City C is transferred via path 26a from Speech Processor section 12a to Packet Multiplexer section 14a where it is queued along with other similar packets and transmitted asynchronously to City B over the first available one of a plurality of serial digital channels 18. At City B, the packet is transferred over internal path 28, requeued, and retransmitted asynchronously to City C over the first available one of a plurality of serial digital channels 22. Upon arrival at City C, the packet is passed from Packet Multiplexer section 14c to Speech Processor section 10c via internal path 26c. The original speech or signalling information is then reconstructed from the digital information contained in the packets and the reconstructed speech is appropriately transferred to the predetermined one of the plurality of telephone lines 10c established by the "virtual circuit"

Speech or signalling information traveling in the reverse direction takes the opposite path The speech or signalling information is appropriately digitized and coded into packets identified by a unique address code at Speech Processor section 12c at City C. Each such packet is then asynchronously transferred to the corresponding Speech Processor section 12a at City A via internal path 26c, the first available one of a plurality of serial digital channels 24, internal path 28, the first available one of a plurality of serial digital channels 20, and internal path 26a. The speech or signalling information is thereupon reconstructed and appropriately transferred to the agreed upon one of the plurality of telephone lines 10a established by the "virtual circuit".

Those skilled in the art will appreciate, from the foregoing explanation, that the Link Access Protocol could just as well have been used to ensure accuracy of messages establishing a "virtual circuit" between a user in City A and a user in City B or between a user in City B and a user in City C. Such two-terminal "virtual circuits" would, of course, utilize internal communication path 26b rather than internal communication path 28 within digital telephone terminal 8b at City B. Those skilled in the art will also appreciate that the sequence of events described above can be extended and applied to larger systems comprising more than three digital telephone terminals.

Figure 2:
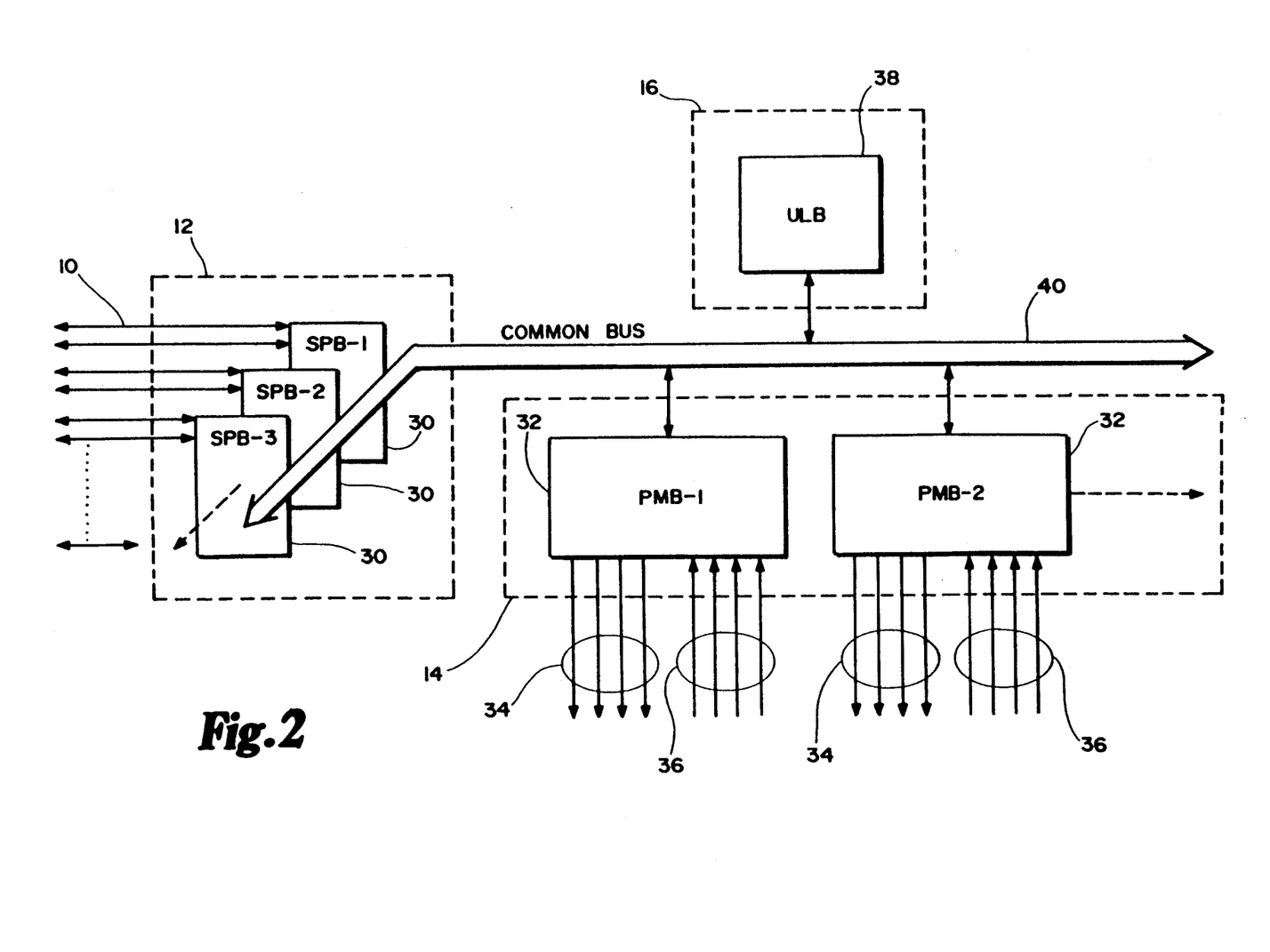
FIG. 2 is a block diagram of a single digital telephone terminal in accordance with the present invention showing its common bus structure and the interconnection of the terminal's constituent printed circuit boards.

FIG. 2 is a block diagram of a single digital telephone terminal such as one identified as either 8a, 8b, or 8c in FIG. 1. FIG. 2 discloses a Speech Processor section 12, a Packet Multiplexer section 14, and a Utility Logic section 16 all interconnected by a Common Bus 40. Common Bus 40 comprises any standard multi-processor bus structure utilizing the "Master-Slave" concept and may, for example, comprise the Multibus (TM) structure developed by the Intel Corporation of 3065 Bowers Avenue, Santa Clara, Calif.

Speech Processor section 12 in FIG. 2 comprises a plurality of Speech Processor Boards, SPB-1, SPB-2, etc., identified individually with the numeral 30. Each Speech Processor Board 30 interfaces with at most two of the total plurality of telephone lines 10 which interface with Speech Processor section 12. Thus, e.g., at least twenty Speech Processor Boards 30 would be required to interface with forty telephone lines 10. In additional to interfacing with two telephone lines, each Speech Processor Board 30 interfaces as a "Slave" to Common Bus 40. Because of its "Slave" status, a Speech Processor Board 30 cannot initiate a Common Bus transaction but can only respond to transactions initiated by a Common Bus "Master".

As also seen in FIG. 2, Packet Multiplexer section 14 comprises a plurality of Packet Multiplexer Boards, PMB-1, PMB-2, etc., identified individually as 32. Each Packet Multiplexer Board 32 interfaces with a group of from one to four outgoing serial digital channels 34 and with a group of from one to four incoming serial digital channels 36 as well as to Common Bus 40. The unidirectional serial digital channels comprising groups 34, 36 may, for example, operate at an individual data rate of 56 kilobits per second. Such relatively low-bandwidth channels are generally utilized for data communication only. (The groups of channels identified as 34, 36 in FIG. 2 correspond to the channels identified in FIG. 1 as 18, 20, 22, 24.) For a simple bidirectional system employing only two digital telephone terminals, one Packet Multiplexer Board 32 interfacing four outgoing and four incoming 56 kilobit/sec digital channels would normally be employed in each terminal for each twenty Speech Processor Boards 30 servicing forty bidirectional telephone lines.

A Packet Multiplexer Board 32 serves as a bus "Master" and initiates all Common Bus transactions on Common Bus 40. Although only one Packet Multiplexer Board 32 can serve as "Master" at any given time, all such boards 32 have "Master" capability and can assume control of Common Bus 40 by means of a standard prioritized bus exchange protocol. In a terminal comprising a plurality of Packet Multiplexer Boards 32, control of Common Bus 40 is time-shared among the members of that plurality. It will be appreciated that the internal data paths denoted 26a, 26b, and 26c in FIG. 1 actually represent transactions between a Speech Processor Board 30 and a Packet Multiplexer Board 32 via common bus 40, and that internal data path 28 actually represents a transaction between two Packet Multiplexer Boards 32 via Common Bus 40.

FIG. 2 further discloses a Utility Logic section 16 comprising a single Utility Logic Board 38. Utility Logic Board 38 interfaces as a "Slave" to Common Bus 40 and can therefore not initiate Common Bus transactions. It comprises conventional hardware to provide the Speech Processor Boards 30 and the Packet Multiplexer Boards 32 with services not found elsewhere in the system. Such services include converting 15 volts dc to 12 volts dc for use by the Packet Multiplexer Boards 32; generating a 40 megahertz clock signal for the Speech Processor Boards 30; providing a time-of-day clock; providing a "watchdog" timer to reset the system and sound an external alarm in the event of a software malfunction; and providing "broad cast" logic to permit a Packet Multiplexer Board 32 to address all of the plurality of Speech Processor Boards 30 by means of a single command. Since such conventional hardware is well-known to one of ordinary skill in the art, Utility Logic Board 38 will not be discussed further herein.

Figure 3:
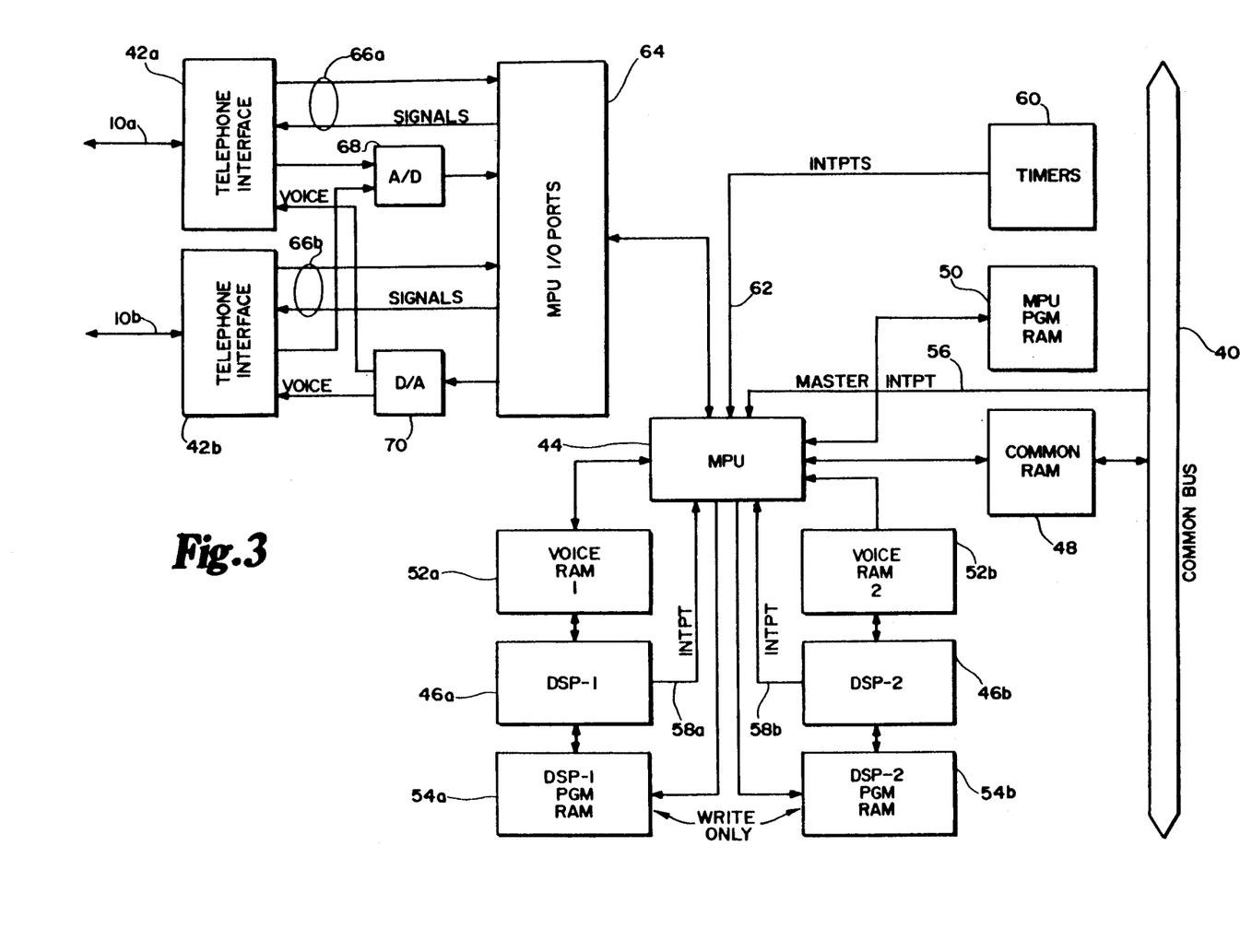
FIG. 3 is a block diagram of any one of the Speech Processor Boards, SPB-1 through SPB-3, identified in FIG. 2.

Referring now to FIG. 3, a Speech Processor Board 30 is depicted in block diagram format. Each SPB 30 interfaces with two bidirectional telephone lines 10a and 10b by means of Telephone Interfaces 42a and 42b. Telephone Interfaces 42a and 42b comprise impedance matching and filtering circuitry as well as amplifiers to modify the incoming and outgoing audio levels and circuitry to detect DTMF (i.e., "Touchtone") digits.

Data manipulation within SPB 30 is under the control of three microprocessor denoted MPU 44, DSP-1 46a, and DSP-2 46b. MPU 44 is a general purpose microprocessing unit which controls all of the input/output operations of SPB 30. It may for example be a type M68000 microprocessor manufactured by Motorola Incorporated of 3501 Ed Bluestein Boulevard, Austin, Texas. DSP-1 46a and DSP-2 46b are special purpose numerical microprocessors utilized for digital signal processing tasks and must be capable of performing complex numerical calculations with high throughput. They may, for example, be type TMS320 microprocessors manufactured by Texas Instruments Incorporated, of P.0. Box 5012, Dallas, Texas. Each such processor serves one telephone channel and processes information flowing in both directions.

Each speech processor board SPB 30 includes random access memory that is divided into six distinct memory areas. Common RAM 48 interfaces both MPU 44 and Common Bus 40. This memory area is addressable for both read and write operations by both MPU 44 and by a Packet Multiplexer Board 32 serving as bus "Master". Common RAM 48 thus serves as an exclusive "gateway" for data interchanges between SPB 30 and a Master PMB 32. It also serves as a storage area for the program of MPU 44. A second memory area 50, a portion of RAM 48, is addressable for read and write operations by MPU 44. This memory area is used as a working area by MPU 44 during execution of its program. Third and fourth memory areas, denoted Voice RAM-1 52a and Voice RAM-2 52b are addressable for both read and write operations by MPU 44 and by DSP-1 46a or DSP-2 46b, respectively. These two memory areas are used by DSP-1 46a and DSP-2 46b as working areas during processing of both outgoing and incoming packets for the two voice channels. Finally, memory areas 54a and 54b are addressable for both read and write operations by DSP-1 46a and by DSP-2 46b, respectively, but by MPU 44 for write operations only. These two areas serve as storage areas for the programs of DSP-1 46a and DSP-2 46b, respectively. During system initialization, programs for MPU 44, DSP-1 46a and DSP-2 46b are copied from PROM memory in a Master PMB 32 to Common RAM 48 in SPB 30 by means of a "broadcast" transaction on Common Bus 40. The programs for DSP-1 and DSP-2 are thereupon transferred to the appropriate program storage areas, 54a, and 54b, respectively, by action of MPU 44.

MPU 44 recognizes six hardware interrupts. A Master PMB 32 can interrupt MPU 44 via Common Bus 40 and Master Interrupt line 56. The digital signal processors DSP-1 46a and DSP-2 46b can each interrupt MPU 44 via interrupt lines 58a and 58b, respectively. In addition, a set of three timers 60 interrupts MPU 44 via a set of three interrupt lines 62 to provide timing references. One of these timing interrupts occurs periodically to identify a sampling interval of 167 microseconds. The other two timers provide interrupts to MPU 44 at one and three millisecond intervals, respectively, and are used in the implementation of less frequently occurring signalling tasks.

MPU 44 transfers data to and from Telephone Interfaces 42a and 42b by means of MPU I/0 Ports 64. Telephone signalling information is transferred directly to and from Telephone Interfaces 42a and 42b via signalling lines 66a and 66b, respectively. Filtered voice information coming from Telephone Interfaces 42a and 42b is digitized by A/D converter 68 and the resulting digital samples are transferred to MPU I/0 Ports 64. Digital samples of voice information going to Telephone Interfaces 42a and 42b are transferred from MPU I/0 Ports 64 to D/A converter 70 and the resultant analog signals are then communicated to Telephone Interfaces 42a and 42b for filtering and level shifting.

In operation, "virtual circuits" are first established between a Speech Processing Board 30 and one or two other Speech Processing Boards 30 at remote locations in the system. Thereafter, the first SPB 30 accepts voice signals on telephone lines 10a and 10b, converts them to packets of digital information, and places the packets in Common RAM 48 for transmission by a Master Packet Multiplexer Board 32. At the other ends of the "virtual circuits", identical Speech Processing Boards 30 are receiving these packets of digital information in their Common RAMs 48, converting the numbers back into analog signals, and applying these analog signals to the appropriate ones of their interfaced telephone lines 10a or 10b. The first SPB 30 is said to be analyzing speech while the second two SPBs 30 are said to be synthesizing speech Simultaneously with these operations, the second SPBs 30 are also analyzing speech signals received on their own telephone lines while the first SPB 30 is synthesizing the results. Thus, each SPB 30 is capable of both analyzing and synthezing speech for two telephone "virtual circuits" simultaneously.

In addition to the tasks of speech analysis and synthesis, each SPB 30 is also capable of performing signalling functions. For each of its two incoming telephone lines 10a and 10b, the SPB 30 identifies on-hooks, off-hooks, dial pulses, valid DTMF digits, and WINKs. It encodes these events into special signalling packets and places these packets in Common RAM 48 for transmission by a PMB 32 to the SPBs 30 at the other ends of the "virtual circuits." The first SPB 30 also receives signalling packets in its Common RAM 48 that were encoded by the remote SPBs 30. It thereupon decodes each such packet's contents and performs the signalling function identified therein on the appropriate telephone line, 10a or 10b.

Still referring to FIG. 3, the tasks of inputting data for speech analysis and outputting data resulting from speech synthesis are periodically initiated every 167 microseconds by virtue of MPU 44 receiving an interrupt from a hardware Timer 60 via an interrupt line 62. MPU 44 thereupon collects a digital sample prepared by the A/D circuitry 68 of the voice signal coming from each Telephone Interface, 42a, and 42b, and transfers same via MPU I/0 Ports 64 to Voice RAM-1 52a and Voice RAM-2 52b, respectively, for analysis. During this same routine, MPU 44 transfers a digital sample of synthesized speech from each of the Voice RAMs, 52a and 52b, to D/A circuitry 70 via MPU I/0 Ports 64 for conversion to analog signals to be communicated to Telephone Interfaces 42a and 42b, respectively.

In between the times that MPU 44 is accessing Voice RAMs 52a and 52b, Voice RAMS 52a and 52b are each employed as working areas by the two Digital Signal Processors, DSP-1 46a and DSP-2 46b, respectively, during implementation of speech analysis and synthesis algorithms stored in their respective program memories 54a and 54b.

During implementation of speech analysis, DSPs 46a and 46b read the digital samples stored by MPU 44. The DSPs periodically estimate the background noise power levels from the magnitudes of the stored digital samples. Samples representing input power levels sufficiently larger than background are assumed to describe speech and are processed accordingly. For such samples, the DSPs perform speech compression computations on successive groups and store the resultant compression variables back in the same Voice RAM, 52a or 52b, respectively. When a DSP has processed an appropriate number of samples, which may range from about 60 to about 300, it either sets a flag in its respective Voice RAM or it interrupts MPU 44 via interrupt line 58a or 58b to inform MPU 44 that a complete frame of speech compression variables has been prepared In response, MPU 44 packs the frame into a minimum-length bit string and writes this string into Common RAM 48. MPU 44 then appends a packet header to the data string and sets a flag in Common RAM 48 to indicate to the Master PMB 32 that a packet is ready for collection.

Telephone speech patterns are characterized by finite spurts of speech separated by discrete pauses When the power level represented by the inputted samples has approached the estimated background level sufficiently closely, the frame preparation sequence is terminated. However, one last frame identified as compressed background noise is prepared by the DSP. Like the preceding speech frames, this background frame is packed into a mini-mum-length bit string and written, along with a packet header, in Common RAM for collection by Master PMB 32. Thus, each spurt of packetized speech will end with a background noise packet. During pauses in speech, speech packets are not normally prepared However, special background noise packets containing updates of compressed background noise information are periodically generated at a very slow rate such as, for example, once every two seconds.

Although MPU 44 is not directly involved in the calculation of speech compression variables, certain processing options can be controlled by MPU 44 through its ability to write into DSP program memories 54a and 54b. This feature is utilized in the present system to provide numerical feedback from Master PMB 32 to the various SPBs 30 in the terminal. A Master PMB 32 periodically broadcasts a number to the Common RAMs 48 of the various SPBs 30. This number indicates the current size of a moving average of the lengths of queues of packets awaiting transmission on the serial digital channels. At each SPB 30, the MPU 44 periodically reads this number and modifies the DSP programs stored in RAM areas 54a and 54b accordingly. Smaller numbers cause the DSPs 46a and 46b to produce larger frames which more accurately describe the voice signal. Larger numbers have the opposite effect and cause the DSPs to produce smaller frames thereby reducing the length of the transmission queues. This numerical feedback technique dynamically adjusts the computational speech compression algorithm in accordance with the current total digital data load. It permits servicing a large number of telephone lines while still greatly reducing the likelihood of having to discard packets during periods of abnormally high data loading.

The speech synthesis procedure begins with a Master PMB 32 writing a speech packet into an input queue area in Common RAM 48 and setting a flag to indicate its arrival to MPU 44. There are two such input queues, one serving each telephone channel, and the packet is placed in the appropriate queue. MPU 48 periodically checks flags in Voice RAMs 52a and 52b to see whether either DSP desires more input data for speech synthesis. If data is desired and a packet is available in Common RAM 44, MPU 44 expands the packet data into a frame of speech compression variables, writes this frame into an input buffer in the appropriate Voice RAM 52a or 52b, and sets a flag in the Voice RAM to inform the appropriate DSP 46a or 46b of the data frame's availability.

DSPs 46a and 46b continually process any frames of speech compression variables found to be available in their input buffers. By means of an appropriate computational inverse speech compression algorithm, they synthesize approximations to the original digitized samples of speech and write these approximations into output FIFO buffers in their respective Voice RAMs. The approximated digital samples are periodically removed from these output FIFOs and transferred to the appropriate D/A circuitry 70 by MPU 44 during the same Timer interrupt routine that is used to bring digitized samples of speech from A/D circuitry 68 into Voice RAM for analysis. Thus, one approximated digital sample of synthesized speech is removed from the output FIFO buffer of each Voice RAM, 52a and 52b, every 167 microseconds.

During speech pauses, no data will be available for processing in a DSP's input buffer in Voice RAM. During these periods, a DSP continually fills its output FIFO buffer with approximated digital samples of representative background noise synthesized from data received earlier in periodically updated background noise information packets.

When speech compression variables first appear in the input buffer indicating the beginning of a spurt of speech, the DSP synthesizes the appropriate digital samples but does not place them at the "head of the line" in the output FIFO buffer. Instead, an intentional delay is introduced by placing the beginning sample a fixed number of samples back from the sample that is next in line to be outputted. This number may, for example, be 300 samples, which corresponds to a time delay of 50 milliseconds. Thus, even after the beginning samples of the speech spurt have been synthesized, MPU 44 will continue to output background noise samples to D/A circuitry 70 for a fixed length of time equal to this Voice RAM output FIFO buffer delay. As a speech spurt progresses, this buffer delay will randomly shrink and grow as a result of statistical variations in packet arrival times. Unless a packet is lost or discarded, however, the nominal buffer delay will remain constant. This nominal buffer delay is chosen to be large enough to buffer against the occurrence of gaps in speech due to packet delays under worst case data loading conditions. At the transmitting PMB 32, a new packet will be discarded rather than queued if it cannot be transmitted within the receive buffer's delay period.

The end of the speech spurt is recognized by DSP 46a or 46b by the background noise information packet that terminates the sequence of speech packets. Upon receiving a background noise frame in its input buffer in Voice RAM, the DSP follows the synthesized speech samples in its output buffer with synthesized background noise samples and then continues to fill its output buffer with synthesized background noise samples for the duration of the pause.

Figure 4:
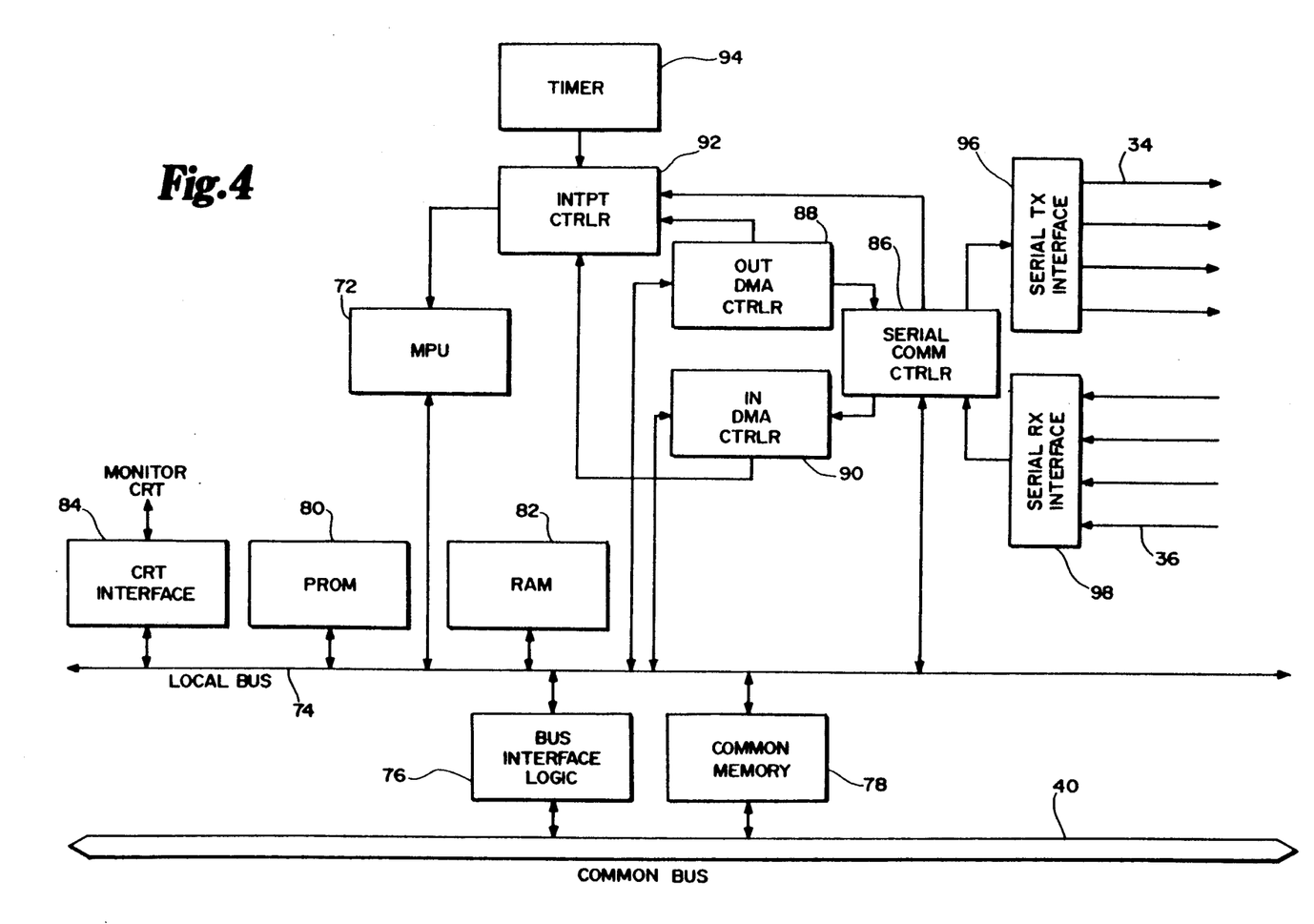
FIG. 4 is a block diagram of either of the Packet Multiplexer Boards, PMB-1 or PMB-2, identified in FIG. 2.

The DSP will recognize that one or more packets have been lost or discarded if there is a gap in speech data available to the DSP that is not preceded by a background noise information packet. In this case, the DSP re-outputs samples synthesized from the last speech information frame received If another packet becomes available before the repeated frame has been converted to analog, the speech synthesis resumes normally Otherwise, the DSP fills its output buffer with as many background noise samples as are required to recover the desired nominal buffer delay. Although this procedure will produce a short "glitch" in the synthesized speech, a terminal's ratio of telephone line connections to total digital channel capacity is so chosen that at full data loading, the occurence of "glitches" due to discarded packets falls within industry standards for acceptable speech clipping FIG. 4 depicts a block diagram of the principal data and control paths of either of the Packet Multiplexer Boards (PMBs) 32. All operations on a particular PMB 32 are under the control of Microprocessor Unit (MPU) 72. MPU 72 is a general purpose microprocessor and may, for example, be a type 80186 microprocessor manufactured by the Intel Corporation of 3065 Bowers Avenue, Santa Clara, Calif.

MPU 72 interfaces directly to Local Bus 74 which, in turn, interfaces to Common Bus 40 through Bus Interface Logic 76. Bus Interface Logic 76 permits MPU 72 to serve as a Common Bus Master and initiate read and write transactions to the Common RAMs 48 located on the various Speech Processor Boards 30. It also permits an MPU 72 to execute a Bus Exchange Protocol with another MPU 72 located on a different Packet Multiplexer Board 32 in order to acquire or relinquish control of Common Bus 40. In addition to Bus Interface Logic 76, Common Memory 78 also interfaces both Local Bus 74 and Common Bus 40. Accordingly, Common Memory 78 can be accessed for read and write operations by both the resident MPU 72 on the same board as Common Memory 78 and by a remote MPU 72 located on a different Packet Multiplexer Board 32 and having control of Common Bus 40.

Programmable Read Only Memory (PROM) 80 and RAM 82 are addressable only by the MPU 72 resident on the same board. PROM 80 contains the program of MPU 72, and RAM 82 is used for temporary storage of flags and data during execution of that program In addition, at least one PMB 32 in the terminal will have the programs of MPU 44 and DSP 46a and 46b of the various SPBs 30 stored in its PROM 80. As described earlier, these programs are transferred to the various SPBs 30 via Common Bus 40 during initialization of the terminal. Operator monitoring and control of PMB 32 is provided through CRT Interface 84 which interfaces with Local Bus 74.

MPU 72 controls data flow to the outgoing serial digital channels 34 as well as data flow from the incoming serial digital channels 36. This control is exercised by the programming of Serial Communications Controller 86, Outgoing DMA (Direct Memory Access) Controller 88, and Incoming DMA Controller 90. The performance of the DMA programming tasks takes place during interrupts that are coordinated by Interrupt Controller 92 along with Programmable Timer 94. Serial data flowing from Serial Communications Controller 86 to the outgoing serial digital channels 34 passes through Serial Transmitter (TX) Interface 96. Serial data flowing from the incoming serial digital channels 36 to Serial Communications Controller 86 passes through Serial Receiver (RX) Interface 98.

Still referring to FIG. 4, events leading to the transmission of speech packets over a serial digital communication channel 34 may be described by the following sequence:

MPU 72 routinely polls the output buffer flags in the Common RAMs 48 of the various SPBs 30 via Common Bus 40. When it finds a packet that is ready for collection, it copies the packet into Common Memory 78 and resets flags in Common RAM 48 to free the buffer area for re-use by the MPU 44.

The packet, now residing in Common Memory 78, is logically attached to the shortest one of the four queues serving the four outgoing serial communication channels. The use of separate queues facilitates channel operations. As those skilled in the art will appreciate however, a single queue serving all four channels could also be employed. If all queues have reached a maximum size, the packet is simply discarded since it would not reach the receiver within the time delay period allowed by the receiver's output buffer. If this is not the case, however, the packet is queued for transmission.

The actual transmission of the queued packets is performed as the result of a byte-by-byte direct memory access transfer from Common Memory 78 to Serial Communications Controller 86 under the control of Outgoing DMA Controller 88. DMA Controller 88 serves all four outgoing channels. Each Channel is separately programmed by MPU 72 for the starting address and number of bytes of the next packet in the channel's queue. Once a DMA channel is programmed and unmasked, the DMA controller takes over and transfers consecutive bytes from Common Memory 78 to Serial Communication Controller 86 via local bus 74. The consecutive bytes are converted to serial format by Serial Communications Controller 86 and transmitted over the appropriate channel by means of Serial TX Interface 96. When the pre-programmed number of bytes has been transferred, Serial Communications Controller 86 appends a special flag byte, 01111110, to the serial data stream to denote the packet's end. In addition, MPU 72 receives an End of Process (EOP) interrupt from DMA Controller 88 via Interrupt Controller 92. During the resulting interrupt-level routine, MPU 72 consults tables in RAM 82 to identify the starting address of the next packet in the channel's transmission queue and then reprograms DMA Controller 88 accordingly. The transmission process will continue in this manner as long as packets are available in the channel's transmission queue. When packets are no longer available, the channel reverts to "idle" status. An "idle" channel continuously transmits flag bytes, 01111110, generated by Communications Controller 86.

While MPU 72 services the transmission queues, it periodically broadcasts a number to the Common RAMs 48 on the Speech Processor Boards 30 indicating the current size of a moving average of the transmission queue lengths As described previously, MPUs 44 utilize this information to provide numerical feedback which dynamically adjusts the courseness of the computational speech compression algorithm in accordance with the current total data load.

Speech packets are transmitted over the serial digital channels without check bytes since the delay caused by retransmitting a packet containing an error would be prohibitively long for communicating speech Data errors due to transmission problems may therefore cause occasional impairments of the received speech. Such occasional impairments are of minor importance and will not ordinarily be noticed, however. As described more fully below, the system mixes speech packets with data packets containing control and signalling information. These data packets include a CRC code for error checking and are retransmitted according to a standard data transmission protocol (LAP-B) if found to be in error.

Continuing to refer to FIG. 4, the sequence of events related to the reception of speech packets on a serial digital communication channel 36 will now be detailed:

Packets arriving on one of the four serial channels 36 pass through the Serial Receiver Interface 98 to the Serial Communications Controller 86. The serial data is thereupon converted to parallel format and transferred byte-by-byte to an input buffer area of common memory 78. This transfer is a direct memory access transfer under the control of Incoming DMA Controller 90.

When Serial Communications Controller 86 receives the special flag byte which had been inserted to denote the end of a packet, an interrupt signal is generated and communicated to MPU 72 via Interrupt Controller 92. As a result of this action, the program of MPU 72 transfers control to an interrupt-level routine.

Upon entering the interrupt-level routine, MPU 72 consults tables in RAM 82 to determine the starting address of the next available buffer in Common Memory 78. It then programs the appropriate channel of Incoming DMA Controller 90 accordingly to prepare to transfer the next incoming packet into this new buffer area.

Following the programming of Incoming DMA Controller 90, MPU 72 examines the header of the newly arrived packet in Common Memory 78. If this header identifies the packet as a speech packet, MPU 72 transfers the packet via Common Bus 40 to the appropriate telephone channel buffer in Common RAM 48 on the appropriate Speech Processor Board 30 as identified by the address in the packet header. A flag is then set in Common RAM 48 to notify MPU 44 of the packet's arrival. MPU 44 routinely inspects the buffer flags in Common RAM 48 looking for fresh packet arrivals.

In this fashion, speech packets will continue to be transferred to the appropriate SPBs 30 as long as they continue to arrive on serial digital communications channels 36.

Figure 5:
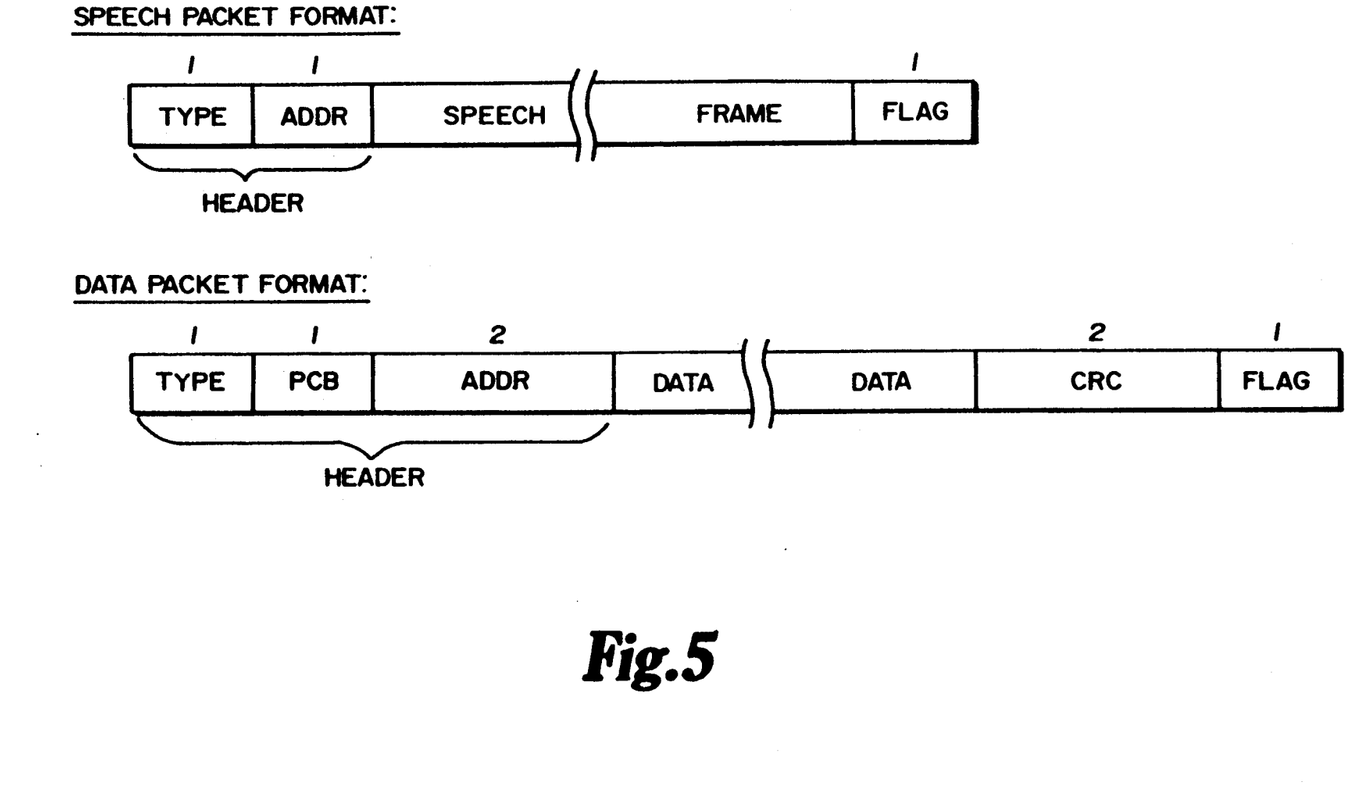
FIG. 5 is a schematic representation of two packet formats employed in communicating over the digital communication channels in accordance with the present invention.

Referring now to FIG. 5, the packet format as it is communicated serially over a digital communication channel is disclosed. Each packet begins with a Packet Header and ends with a terminating Flag Byte (01111110). As disclosed above, this Flag Byte is automatically appended to the end of the packet by Serial Communications Controller 86.

Two packet formats are disclosed in FIG. 5; a format appropriate to transmission of a frame of digital compression variables, and a format appropriate to the transmission of all other types of digital data. The former is referred to as a Speech Packet and the latter is referred to as a Data Packet. The Packet Header of both packet formats begins with an eight-bit Type Byte, and this Type Byte identifies whether the ensuing packet is a Speech Packet or a Data Packet. For both packet formats, the Type Byte conveys only four bits of digital information, and the other four bits are utilized as checkbits to ensure accuracy of the four information bits.

If the four information bits of the Type Byte represent a binary number between 0 and 3—that is, if the higher order two of these four bits are zeros—the packet is identified as a Speech Packet. In this case, the Packet Header is two bytes, or sixteen bits long. A Speech Packet Header contains a ten-bit address field consisting of an eight-bit Address Byte along with the two lower order bits of the Type Byte information field. Thus, there are 1024 unique digital codes available for establishing virtual circuits between speech sources and corresponding speech sinks.

If the four information bits of the Type Byte represent a binary number between 4 and 15, the packet is identified as a Data Packet, and the type of data being conveyed is identified by the value of this binary number. Thus, provision has been made for communciating up to twelve different types of data. At the present time, three different types of data have been differentiated:

Telephone Signalling or Line Control Data. Data Packets of this type convey signalling information such as on-hooks, off-hooks, and dialing codes from a Speech Processing Board 30 at one location to a corresponding Speech Processing Board 30 at a second location for appropriate interfacing to a telephone line.

Multiplexer Control Data. Data Packets of this type convey messages between a Packet Multiplexer Board 32 at one location and a Packet Multiplexer Board 32 at a second location. They are used for a variety of control purposes including the establishment of virtual circuits linking sources to corresponding sinks.

User Data. Data Packets of this type convey data provided in digital format by a system user data source for delivery in digital format to a system user data sink.

Continuing to refer to FIG. 5, a Data packet Header is seen to be four bytes long. In addition to the Type Byte, the Packet Header contains a single Packet Control Byte (PCB) and a two-byte Address field. The two-byte Address field identifies the destination of individual Data Packets by any one of up to 65535 unique digital codes. The Packet Control Byte contains information for data link level control and conforms with the Link Access Protocol (LAP-B) defined in the X.25 standard As those skilled in the art will appreciate, the purpose of this byte is to provide means for retransmission of a Data Packet if it is found to be in error. Immediately following the data in the packet is a two-byte Cyclic Redundancy Check (CRC) code. These bytes provide means for checking a received Data Packet to determine whether the data has been corrupted in transmission Thus, the Data Packet Format provides both means for detecting data transmission errors and means for implementing retransmission when such errors are detected.

The system as disclosed herein above inputs telephone speech signals in analog format and outputs telephone speech signals in analog format As those skilled in the art will appreciate, however, the input and output formats could also be digital. In fact, certain simplifications can be accomplished when telephone signals are interfaced to a digital telephone terminal in multiplexed serial digital format rather than in analog format since the operations of filtering, sampling, analog to digital conversion, and digital to analog conversion are thereby avoided. Furthermore, as those skilled in the art will appreciate, digital data other than speech data can also be assembled into packets and communicated from a data source to a data sink. Thus, the system disclosed herein is broadly capable of simultaneously communicating a mixture of analog telephone speech signals, digital telephone speech signals, and digital data signals from a plurality of appropriate sources at a first location to corresponding ones of a plurality of appropriate sinks at a second location in digital packet format.

I claim:

1. A communication system for communicating speech signals over a communication medium, said speech signals comprising alternating speech spurts and speech pauses, comprising:
   means for formatting said speech signals into successive groups of digital bits, each of said groups of bits being derived from a speech interval comprising no more than one of said speech spurts;
   means for transforming said groups of digital bits into variable length corresponding frames of digital compression variables comprised of digital bits whereby the ratio of the number of bits in a corresponding frame to the number of bits in the group to which the frame corresponds to is less than one;
   means for appending an identifying header to said frames of digital compression variables to provide variety sized information packets adapted for asynchronous transmission along said communication medium; and
   means for transmitting said information packets asynchronously along said communication medium.

2. The invention as claimed in claim 1, said means for formatting said speech signal into groups of digital bits including means for formatting said groups from variable length speech intervals, said variably sized corresponding frames varying in length in relation to the length of its corresponding speech interval.

3. A communication system for communicating an information signal over a communication medium having a communication medium bandwidth comprising:
   means for formatting said information signal into successive groups;
   means for transforming said groups into variable length corresponding frames of compression variables;
   means for appending an identifying header to said frames to provide information packets adapted for asynchronous transmission along a communication medium;
   means for transmitting said information packets asynchronously along said communication medium;
   means for detecting pauses within said information signal; and
   means for curtailing the transmission of information packets along said communication medium when said pauses are detected, thereby conserving use of said communication medium bandwidth.

4. A communication system as claimed in claim 3, said communication medium presenting a background noise power level and said information signal having a signal power level, said means for detecting pauses within said information signal including means for determining said background noise power level and means for comparing said signal power level to said background noise power level.

5. A communication system for communicating an information signal over a communication medium having a communication medium bandwidth, comprising:
   means for formatting said information signal into successive groups of digital bits;
   means for transforming said groups of digital bits into variable length corresponding frames of compression variables adapted or asynchronous transmission along said communication medium, said compression variable comprised of digital bits, the number of digital bits in a corresponding frame compared to the number of bits in the group to which the frame corresponds to defining a compression ratio of less than one;

means for transmitting said frame asynchronously along said communication medium thereby using at least a portion of said communication medium bandwidth for communicating said information signal; and means operably coupled to said means for transforming groups into variable length corresponding frames for dynamically adjusting said compression ratio in inverse relation to the amount of said communication bandwidth being used whereby the length of said frames is selectively reduced to conserve use of said communication bandwidth.

6. A communication system as claimed in claim 5, including means for appending an identifying header to said frames to provide information packets, said means for transmitting said frames comprising mans for transmitting said information packets along said communication medium.

* * * * *

UNITED STATES PATENT AND TRADEMARK OFFICE
CERTIFICATE OF CORRECTION

PATENT NO.  : 5,018,136                                        Page 1 of 3
DATED       : May 21, 1991
INVENTOR(S) : Raphael Gollub It is certified that error appears in the above-identified patent and that said Letters Patent is hereby corrected as shown below:

In column 1, line 64, after "tice" and before "In" insert a period.

In column 4, line 50, after "nels" insert a period.

In column 9, line 18, after "speech" and before "Simultaneously" insert a period.

In column 10, line 7, after "prepared" and before "In" insert a period.

In column 10, line 15, after "pauses" and before "When" insert a period.

In column 10, line 22, delete "mini-mum-length" and substitute therefor --minimum-length--.

In column 10, line 26, after "prepared" insert a period.

In column 11, line 65, after "received" and before "If" insert a period.

In column 11, line 68, after "mally" and before "Otherwise," insert a period.

In column 12, line 8, after "clipping" insert a period.

UNITED STATES PATENT AND TRADEMARK OFFICE
CERTIFICATE OF CORRECTION

PATENT NO. : 5,018,136

DATED : May 21, 1991

INVENTOR(S) : Raphael Gollub

It is certified that error appears in the above-identified patent and that said Letters Patent is hereby corrected as shown below:

In column 12, line 38, after "program" and before "In" insert a period.

In column 13, line 50, after "lengths" and before "As" insert a period.

In column 13, line 58, after "speech" and before "Data" insert a period.

In column 15, line 37, after "standard" and before "As" insert a period.

In column 15, line 44, after "mission" and before "Thus," insert a period.

In column 15, line 50, after "format" and before "As" insert a period.

In column 16, line 17, delete "variety" and substitute therefor --variably--.

In column 16, line 23, delete "signal" and substitute therefor --signals--.

In column 16, line 65, delete "variable" and substitute therefor --variables--.

UNITED STATES PATENT AND TRADEMARK OFFICE
CERTIFICATE OF CORRECTION

PATENT NO. : 5,018,136
DATED : May 21, 1991
INVENTOR(S) : Raphael Gollub

It is certified that error appears in the above-identified patent and that said Letters Patent is hereby corrected as shown below:

In column 16, line 65, delete "variable' and substitute therefor --variables--.

Signed and Sealed this

Twenty-second Day of September, 1992

Attest:

DOUGLAS B. COMER

*Attesting Officer*          Acting Commissioner of Patents and Trademarks